(12) United States Patent
Chen et al.

(10) Patent No.: US 12,388,632 B2
(45) Date of Patent: Aug. 12, 2025

(54) RESOURCE ALLOCATION METHOD AND SYSTEM IN QUANTUM KEY DISTRIBUTION OPTICAL NETWORK

(71) Applicant: SOOCHOW UNIVERSITY, Suzhou (CN)

(72) Inventors: Bowen Chen, Suzhou (CN); Weike Ma, Suzhou (CN); Ling Liu, Suzhou (CN); Hong Chen, Suzhou (CN); Mingyi Gao, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 202 days.

(21) Appl. No.: 18/196,358

(22) Filed: May 11, 2023

(65) Prior Publication Data

US 2023/0283460 A1 Sep. 7, 2023

Related U.S. Application Data

(63) Continuation of application No. PCT/CN2021/140054, filed on Dec. 21, 2021.

(30) Foreign Application Priority Data

Dec. 13, 2021 (CN) .......................... 202111518147.6

(51) Int. Cl.
*H04L 9/08* (2006.01)
(52) U.S. Cl.
CPC .......... *H04L 9/0855* (2013.01); *H04L 9/0819* (2013.01); *H04L 9/0858* (2013.01)
(58) Field of Classification Search
CPC ... H04L 9/0855; H04L 9/0819; H04L 9/0858; H04Q 11/00
See application file for complete search history.

(56) References Cited

U.S. PATENT DOCUMENTS 6,522,735 B1 * 2/2003 Fortman ............... H04M 15/55
                                                 379/114.03
7,403,623 B2 * 7/2008 Cerf ...................... H04L 9/0858
                                                 380/278

(Continued)

FOREIGN PATENT DOCUMENTS

| CN | 103647598 A | 3/2014 |
| CN | 109005030 A | 12/2018 |

(Continued)

OTHER PUBLICATIONS

Trindade et al.; "Cognitive Control-Loop for Elastic Optical Networks with Space-Division Multiplexing", Nov. 2021, Sensors 2021, 21, 7821. https://doi.org/10.3390/s21237821, pp. 1-21. (Year: 2021).*

(Continued)

*Primary Examiner* — Matthew Smithers
(74) *Attorney, Agent, or Firm* — SZDC Law PC (57) ABSTRACT

The invention provides a resource allocation method and system in a quantum key distribution optical network. The method includes steps of: setting a topological structure of a quantum key distribution optical network, and initializing parameters in the topological structure; generating a service request, and categorizing a security level of a service according to a security requirement degree of the service, where the security level corresponds to a security score; establishing an optimization objective function to maximize a security score of the quantum key distribution optical network and minimize an occupancy of wavelength and timeslot resources; and establishing a constraint satisfying the optimization objective function, and allocating corresponding wavelength and timeslot resources to the service request under the constraint. The invention implements a joint optimization objective of maximizing a security score of a (Continued)

network and minimizing the occupation of wavelengths and timeslots.

7 Claims, 5 Drawing Sheets

(56) References Cited

U.S. PATENT DOCUMENTS

| | | | | |
|---|---|---|---|---|
| 8,995,842 | B1* | 3/2015 | Kojima | H04B 10/70 398/118 |
| 9,621,313 | B2* | 4/2017 | Zhu | H04Q 11/0066 |
| 9,769,087 | B2* | 9/2017 | Agarwal | H04J 14/0272 |
| 2007/0212063 | A1* | 9/2007 | Meli | H04J 14/0227 398/30 |
| 2009/0010435 | A1* | 1/2009 | Zbinden | H04B 10/70 380/256 |
| 2011/0026925 | A1* | 2/2011 | Mu | H04J 14/0257 398/79 |
| 2020/0107216 | A1 | 4/2020 | Greel et al. | |
| 2020/0358606 | A1* | 11/2020 | Zhao | H04L 9/12 |
| 2021/0083867 | A1* | 3/2021 | Bush | H04L 45/121 |
| 2021/0084078 | A1* | 3/2021 | Bush | H04L 63/105 |
| 2021/0175977 | A1* | 6/2021 | Cavaliere | H04J 14/0267 |
| 2022/0166610 | A1* | 5/2022 | Rahman | H04L 43/0811 |
| 2023/0155689 | A1* | 5/2023 | Djordjevic | H04B 10/118 398/121 |
| 2023/0199552 | A1* | 6/2023 | Bahl | H04W 12/08 398/79 |

FOREIGN PATENT DOCUMENTS

| | | |
|---|---|---|
| CN | 111711517 A | 9/2020 |
| CN | 112737776 A | 4/2021 |
| CN | 112769550 A | 5/2021 |
| WO | 2021088230 A1 | 5/2021 |

OTHER PUBLICATIONS

Chen et al.; "ADA-QKDN: a new quantum key distribution network routing scheme based on application demand adaptation", Sep. 2021, Quantum Information Processing (2021) 20:309, https://doi.org/10.1007/s11128-021-03246-2. pp. 1-22. (Year: 2021).*

Zhang et al; "On Throughput Optimization in Software-Defined Multi-Dimensional Space Division Multiplexing Optical Networks", May 2021, Journal of Lightwave Technology, vol. 39, No. 9, pp. 2635-2651. (Year: 2021).*

Yu et al.; "Multi-Dimensional Routing, Wavelength, and Timeslot Allocation (RWTA) in Quantum Key Distribution Optical Networks (QKD-ON)", Dec. 2020, Appl. Sci. 2021, 11, 348. https://doi.org/10.3390/U.S. Appl. No. 11/010,348, pp. 1-14. (Year: 2020).*

Ma et al.; "Routing, Wavelength and Time-Slot Assignment Approaches with Security Level in QKD-Enabled Optical Networks", Oct. 2020, Asia Communications and Photonics Conference, pp. 1-3. (Year: 2020).*

Dong et al.; "Auxiliary graph based routing, wavelength, and time-slot assignment in metro quantum optical networks with a novel node structure", Mar. 2020, Optics Express, vol. 28, No. 5, pp. 5936-5952. (Year: 2020).*

Wang et al.; "Protection Schemes for Key Service in Optical Networks Secured by Quantum Key Distribution (QKD)", Mar. 2019, Journal Optical Communication Network, vol. 11, No. 3, pp. 67-78. (Year: 2019).*

Zhao et a.; "Resource Allocation in Optical Networks Secured by Quantum Key Distribution", IEEE Communications Magazine, Aug. 2018, pp. 130-137. (Year: 2018).*

Grillo et al.; "Resource allocation in a Quantum Key Distribution Network with LEO and GEO trusted-repeaters", 2021, IEEE, pp. 1-6. (Year: 2021)*

Weike Ma et al., "Routing, Wavelength and Time-Slot Assignment Approaches with Security Level in QKD-Enabled Optical Networks" Asia Communications and Photonics Conference, IEEE (Mar. 5, 2021).

* cited by examiner

RESOURCE ALLOCATION METHOD AND SYSTEM IN QUANTUM KEY DISTRIBUTION OPTICAL NETWORK

This application is a Continuation Application of PCT/CN2021/140054, filed on Dec. 21, 2021, which claims priority to Chinese Patent Application No. 202111518147.6, filed on Dec. 13, 2021, which is incorporated by reference for all purposes as if fully set forth herein.

FIELD OF THE INVENTION

The present invention relates to the field of communication technologies, and in particular, to a resource allocation method and system in a quantum key distribution optical network.

DESCRIPTION OF THE RELATED ART

With the continuous development of 5G, cloud computing, big data, and other technologies, optical networks are gradually becoming larger in capacity, more intelligent, and more widely used, and the transmission of information is becoming more convenient. With the wide application of Internet nowadays, a large amount of data needs to be generated, sent, and stored every day. Such data involves sensitive information such as personal information, national business and politics, posing higher requirements for the security and confidentiality of network transmission. Once data transmitted over the network is leaked, a large number of users and services are affected, causing unpredictable losses. Many organizations with high security requirements in finance, transportation, energy, health, and other fields urgently require long-term secure communication over networks. Data encryption has become the key to ensuring the confidentiality and integrity of data transmission.

Today, optical networks are the infrastructure for data service transmission. Because of the inherent isolation of optical signals inside a fiber optic medium, a fiber optic transmission network has been considered a very secure network. In a conventional cryptosystem, for example, both symmetric key encryption and asymmetric key encryption have been developed to encrypt sensitive data. However, the security of a current cryptosystem that uses key encryption relies on the limitations of the computing power available to any eavesdropper to crack keys. In recent years, with the continuous development of big data and computer hardware technology and the emergence of quantum computers, quantum key distribution (QKD) has gradually become a research hotspot in the field of network information security. The rise of powerful quantum computers and quantum algorithms has made conventional data transmission encryption insecure. In the quantum key distribution technology based on the quantum no-cloning theorem and the Heisenberg uncertainty principle, in combination with the "one-time pad" encryption algorithm, a message exchanged between two endpoints may be encrypted by using a randomly generated shared secure quantum key, thereby greatly improving the security of data service transmission. In the QKD, classical binary digits in a quantum state of light are encoded into quantum bits to implement secure key distribution, which makes it physically impossible to corrupt an encryption process through eavesdropping. Therefore, QKD networks have a great potential to be deployed in the near future to the ubiquitous infrastructure of optical fibers in existing telecommunication networks to provide long-term security for data communication.

In most current QKD networks, the key rate of quantum keys can only reach 1 Mbit/s to 2 Mbit/s in a 50-km fiber link. Therefore, it is very necessary to allocate quantum key resources appropriately and effectively. However, when two communication parties carry out key negotiation, the two communication parties and a quantum link can no longer serve other services. At this time, if a new service arrives, a new quantum channel is required to allocate quantum key resources, causing a great increase in the economic cost of the whole system. Therefore, the resource allocation based on a quantum key distribution optical network becomes one of the most critical issues. In addition, in a quantum key distribution optical network, when each service enters a network, a security requirement degree of the service should be taken into consideration to appropriately select route, wavelength, and timeslot resources for the service. That is, to allocate resources to each service request, route, wavelength, and timeslot allocation should be considered, and before a resource pre-allocation process, a security requirement degree of the service request needs to be measured, which greatly increases the complexity of resource allocation.

SUMMARY OF THE INVENTION

An objective of the present invention is to provide a resource allocation method and system in a quantum key distribution optical network, to solve the problems of low network security and inappropriate resource occupation, thereby implementing a joint optimization objective of maximizing a security score of a network and minimizing the occupation of wavelengths and timeslots.

To solve the foregoing technical problems, the present invention provides a resource allocation method in a quantum key distribution optical network, including the following steps:

S1: setting a topological structure of a quantum key distribution optical network, and initializing parameters in the topological structure;

S2: generating a service request, and categorizing a security level of a service according to a security requirement degree of the service, where the security level corresponds to a security score;

S3: establishing an optimization objective function to maximize a security score of the quantum key distribution optical network and minimize an occupancy of wavelength and timeslot resources; and S4: establishing a constraint satisfying the optimization objective function, and allocating corresponding wavelength and timeslot resources to the service request under the constraint.

As a further improvement to the present invention, the topological structure of the quantum key distribution optical network is G(V, L, Λ, Δ, T), where a parameter V is a set of optical switching nodes, L is a set of directed links, $\Lambda=\{\lambda_1, \lambda_2, \lambda_3, \ldots, \lambda_n\}$ is a set of conventional wavelengths in an optical network, $\Delta=\{\lambda_1^Q, \lambda_2^Q, \lambda_3^Q, \ldots, \lambda_n^Q\}$ is a set of quantum channel dedicated wavelengths, $T=\{t_1, t_2, t_3, \ldots, t_n\}$ is a set of available timeslots in a quantum channel, and the initializing parameters in the topological structure is setting a link status, the number of the optical switching nodes, the number of optical fiber links, the number of conventional wavelengths and the number of quantum channel dedicated wavelengths on a link, and the number of timeslots.

As a further improvement to the present invention, a service request $CR(s,d,w,t_k,sl)$ is generated in step S2, the service request $CR(s,d,w,t_k,sl)$ requires w conventional wavelengths for data transmission from a source node s to a destination node d, the number of quantum keys used for encryption is $t_k$ timeslots, and sl is the security level of the service.

As a further improvement to the present invention, in the quantum key distribution optical network, an overall security score of the entire network is:

$$\sum_{(s,d) \in CR} \sum_{(i,j) \in L} \sum_{\lambda \in \Lambda} W_{(i,j),\lambda}^{(s,d)} * SR_{s,d}, \quad (1)$$

where $W_{(i,j),\lambda}^{(s,d)}$ represents that when a connection request (s, d) occupies a conventional wavelength λ on a link (i, j), a value of the variable is 1, or otherwise is 0, and $SR_{s,d}$ represents a security score from the source node s to the destination node d.

As a further improvement to the present invention, the optimization objective function is:
Minimize:

$$G = \alpha * \sum_{(s,d) \in CR} \sum_{(i,j) \in L} \sum_{\lambda \in \Lambda} W_{(i,j),\lambda}^{(s,d)} * SR_{s,d} + \beta * \left( \sum_{(s,d) \in CR} \sum_{(i,j) \in L} \sum_{\lambda \in \Lambda} W_{(i,j),\lambda}^{(s,d)} + \sum_{(s,d) \in CR} \sum_{(i,j) \in L} \sum_{\lambda^Q \in \Delta} \sum_{t \in T_k} T_{(i,j),\lambda^Q,t}^{(s,d)} \right), \quad (2)$$

where represents an occupation status of a conventional wavelength λ by a service request CR(s,d) on a link (i, j), and is 1 if the wavelength is occupied, or otherwise is 0; $T_{(i,j),\lambda^Q,t}^{(s,d)}$ represents an occupation status of a timeslot t on a quantum channel dedicated wavelength $\lambda^Q$ on the link (i, j) by the service request CR(s,d), and is 1 if the timeslot is occupied, or otherwise is 0; $SR_{s,d}$ represents a security score from a source node s to a destination node d; and α and β are adjustment parameters, and weights of optimization objectives are changed by adjusting α and β.

As a further improvement to the present invention, a method for using the optimization objective function G to maximize the security score of the quantum key distribution optical network and minimize the occupancy of wavelength and timeslot resources includes steps: increasing the security score of the quantum key distribution optical network by optimizing a total $W_{(i,j),\lambda}^{(s,d)} * SR_{s,d}$, reducing the number of wavelengths and timeslots occupied by a connection request by optimizing $W_{(i,j),\lambda}^{(s,d)}$ and $T_{(i,j),\lambda^Q,t}^{(s,d)}$, to increase an occupancy of resources in the quantum key distribution optical network.

As a further improvement to the present invention, the constraint in step S4 includes: a consistency constraint of bandwidth traffic conservation and wavelength and timeslot resource of a service request, an uniqueness constraint of wavelength and timeslot resource occupation, a wavelength and timeslot capacity constraint, and a continuity constraint of wavelength and timeslot resource.

As a further improvement to the present invention, the consistency constraint of bandwidth traffic conservation and wavelength and timeslot resource of the service request is:

$$\sum_{j:(i,j) \in L} \sum_{\lambda^Q \in \Delta} \sum_{t \in T_k} T_{(i,j),\lambda^Q,t}^{(s,d)} - \sum_{j:(i,j) \in L} \sum_{\lambda^Q \in \Delta} \sum_{t \in T_k} T_{(i,j),\lambda^Q,t}^{(s,d)} = \quad (3)$$

-continued $$\begin{cases} TR_{s,d} & i = s, \\ -TR_{s,d} & i = d, \forall (s,d), \\ 0 & \text{else}, \end{cases}$$

$$\sum_{j:(i,j) \in L} \sum_{\lambda \in \Lambda} W_{(i,j),\lambda}^{(s,d)} - \sum_{j:(i,j) \in L} \sum_{\lambda \in \Lambda} W_{(i,j),\lambda}^{(s,d)} = \begin{cases} WR_{s,d} & i = s, \\ -WR_{s,d} & i = d, \forall (s,d), \\ 0 & \text{else}, \end{cases} \quad (4)$$

$$\sum_{j:(i,j) \in L} T_{(i,j),\lambda^Q,t}^{(s,d)} = \sum_{j:(i,j) \in L} T_{(i,j),\lambda^Q,t}^{(s,d)} \forall (s,d), \quad (5)$$

$$i, i \neq s, i \neq d, \lambda^Q \in \Delta, t \in T_k, \text{ and}$$

$$\sum_{j:(i,j) \in L} W_{(i,j),\lambda}^{(s,d)} = \sum_{j:(i,j) \in L} W_{(i,j),\lambda}^{(s,d)} \forall (s,d), i, i \neq s, i \neq d, \lambda \in \Lambda, \quad (6)$$

where in the constraints (3) and (4), in a working path found for each service request, outgoing traffic of a source node is equal to a wavelength requirement $WR_{s,d}$ and a timeslot requirement $TR_{s,d}$ of the service request, and incoming traffic of a destination node is equal to the wavelength requirement $WR_{s,d}$ and the timeslot requirement $TR_{s,d}$ of the service request, and at the same time an intermediate node on a working path of each service has equal incoming traffic and outgoing traffic; and in the constraints (5) and (6), wavelength and timeslot resources allocated on each link in a working path satisfy the consistency constraint, that is, each link in a working path selected for a service corresponds to the same positions of wavelength and timeslot resources;

the uniqueness constraint of wavelength and timeslot resource occupation is:

$$\sum_{(s,d) \in CR} T_{(i,j),\lambda^Q,t}^{(s,d)} \leq 1 \quad \forall (i,j), \lambda^Q \in \Delta, t \in T_k, \text{ and} \quad (7)$$

$$\sum_{(s,d) \in CR} W_{(i,j),\lambda}^{(s,d)} \leq 1 \quad \forall (i,j), \lambda \in \Lambda, \quad (8)$$

where in the constraints (7) and (8), any conventional wavelength and timeslot on each link can only be occupied by at most one service at the same time;

the wavelength and timeslot capacity constraint is:

$$\sum_{(s,d) \in CR} \sum_{\lambda \in \Lambda} W_{(i,j),\lambda}^{(s,d)} \leq |\Lambda| \quad \forall (i,j), \quad (9)$$

$$\sum_{(s,d) \in CR} \sum_{\lambda^Q \in \Delta} Q_{(i,j),\lambda^Q}^{(s,d)} \leq |\Delta| \quad \forall (i,j), \quad (10)$$

$$\sum_{(s,d) \in CR} \sum_{t \in T_k} T_{(i,j),\lambda^Q,t}^{(s,d)} \leq |T_k| \quad \forall (i,j), \text{ and} \quad (11)$$

$$Q_{(i,j),\lambda^Q}^{(s,d)} \leq \sum_{t \in T_k} T_{(i,j),\lambda^Q,t}^{(s,d)} \quad \forall (s,d), (i,j), \lambda^Q \in \Delta, \quad (12)$$

where |Λ| represents the number of conventional wavelengths on each link, |Δ| represents the number of quantum channel dedicated wavelengths on each link, $|T_k|$ represents the number of timeslots in each quantum channel dedicated wavelength, $Q_{(i,j),\lambda^Q,t}^{(s,d)}$ represents an occupation status of the quantum channel dedicated wavelength $\lambda^Q$ on the link (i, j) by a service CR(s,d), and is 1 if the wavelength is occupied, or otherwise is 0; the constraints (9), (10), and (11) represent that in each link, wavelength and timeslot resources allocated to all services are less than set wavelength and timeslot thresholds; and the constraints (12) represents that different services may occupy different timeslot resources of the same quantum dedicated wavelength; and the continuity constraint of wavelength and timeslot resource is:

$$\left(W^{(s,d)}_{(i,j),\lambda} - W^{(s,d)}_{(i,j),\lambda+1} - 1\right) \times (-\theta) \geq \sum_{x \in [\lambda+2,|\Lambda|]} W^{(s,d)}_{(i,j),x} \forall (i, j), (s, d), \lambda, s \neq d, \quad (13)$$

$$\left(W^{(s,d)}_{(i,j),\lambda} - 1\right) \times \theta + WR_{s,d} \leq \sum_{\lambda \in \Lambda} W^{(s,d)}_{(i,j),\lambda} \forall (i, j), (s, d), \lambda, s \neq d, \quad (14)$$

$$\left(T^{(s,d)}_{(i,j),\lambda Q,t} T^{(s,d)}_{(i,j),\lambda Q,t+1} - 1\right) \times (-\theta) \geq \sum_{y \in [t+2,|T_k|]} T^{(s,d)}_{(i,j),\lambda Q,y} \forall (i, j), \quad (15)$$

$$(s, d), \lambda^Q, t, s \neq d, \text{ and}$$

$$\left(T^{(s,d)}_{(i,j),\lambda Q,t} - 1\right) \times \theta + TR_{s,d} \leq \sum_{t \in T_k} T^{(s,d)}_{(i,j),\lambda Q,t} \forall (i, j), (s, d), \lambda^Q, t, s \neq d, \quad (16)$$

where θ is a positive number, and the constraints (13) to (16) represent that in each link, conventional wavelengths allocated to each service and timeslot resources on quantum channel wavelengths are in a continuous idle state.

A resource allocation system in a quantum key distribution optical network includes:

a network initialization module, configured to: set a topological structure of a quantum key distribution optical network, and initialize parameters in the topological structure;

a service request generation module, configured to: generate a service request, and categorize a security level of a service according to a security requirement degree of the service, where the security level corresponds to a security score;

an optimization objective establishment module, configured to establish an optimization objective function to maximize a security score of the quantum key distribution optical network and minimize an occupancy of wavelength and timeslot resources; and a resource allocation module, configured to: establish a constraint satisfying the optimization objective function, and allocate corresponding wavelength and timeslot resources to the service request under the constraint.

As a further improvement to the present invention, the service request generation module further includes a security level categorization module of a service request, configured to: preclassify the service request according to a security requirement degree of the service request, and categorize the security level of the service, where for service requests of different security levels, resources are allocated in quantum dedicated wavelengths of corresponding security levels; and the resource allocation module further includes a constraint module, the constraint module including:

a consistency calculation module of traffic conservation and resource of a service request, configured to calculate a consistency constraint of traffic conservation and resource of the service request in the quantum key distribution optical network, to make incoming traffic equal to outgoing traffic and resources occupy the same positions on each link;

a uniqueness calculation module of wavelength and timeslot resource occupation, configured to calculate a uniqueness constraint of wavelength and timeslot resources, to ensure that only one service can be occupied at each moment at each wavelength and timeslot position;

a wavelength and timeslot capacity calculation module, configured to calculate a constraint of wavelength and timeslot capacity, to make wavelength and timeslot resources allocated to all services less than thresholds set in the quantum key distribution optical network; and a wavelength and timeslot continuity calculation module, configured to calculate a wavelength and timeslot continuity constraint, to make conventional wavelengths allocated to each service and timeslot resources are in a continuous idle state, where the constraint modules collaborate with each other to complete optimization and allocation of the security score of the network and wavelength and timeslot resources.

Beneficial effects of the present invention: In the present invention, to solve the resource allocation problem in a quantum key distribution optical network, measure and improve the security performance of the network, and ensure that quantum keys can be obtained for more services for secure encryption, a security requirement level of each service entering the quantum key distribution optical network is classified, so that during the allocation of wavelength and timeslot resources, resources of corresponding security levels can be efficiently and appropriately allocated, to allow the entire network to reach the most secure state. In the present invention, an objective function of maximizing a security score of the network and minimizing quantities of wavelengths and timeslots occupied in the network is mainly solved to satisfy the constraints of the objective function; and a different security level is assigned to a service according to a security requirement degree of the service before resource pre-allocation, and it is set on each link that different wavelength segments correspond to different security levels. Therefore, in the quantum key distribution optical network, the present invention mainly solves routing, wavelength allocation, and timeslot allocation methods for service security level classification, and establishes a joint optimization objective function of maximizing the security score of the network and minimizing the occupation of wavelength and timeslot resources. The objective function is referred to as a joint optimization integer linear programming model. In the quantum key distribution optical network, the quality of service of network service transmission and the security of the entire network are improved through the proposed joint optimization integer linear programming model.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
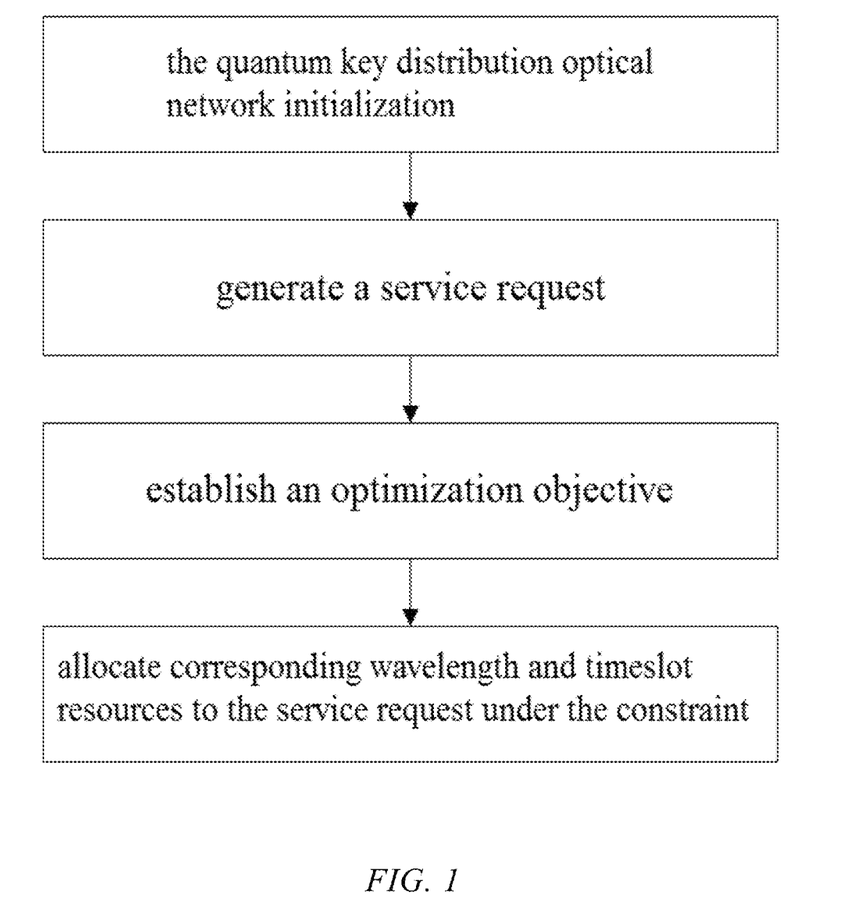
FIG. 1 is an overall schematic flowchart of a method according to the present invention.

Referring to FIG. 1, the present invention provides: a resource allocation method in a quantum key distribution optical network. The method includes the following steps:

S1: setting a topological structure of a quantum key distribution optical network, and initializing parameters in the topological structure;

S2: generating a service request, and categorizing a security level of a service according to a security requirement degree of the service, where the security level corresponds to a security score;

S3: establishing an optimization objective function to maximize a security score of the quantum key distribution optical network and minimize an occupancy of wavelength and timeslot resources; and S4: establishing a constraint satisfying the optimization objective function, and allocating corresponding wavelength and timeslot resources to the service request under the constraint.

In a quantum key distribution optical network, to solve the problems of low network security and inappropriate resource occupation, the present invention provides a resource allocation method in a quantum key distribution optical network, thereby implementing a joint optimization objective of maximizing a security score of a network and minimizing the occupation of wavelengths and timeslots. In the provided method in the present invention, a service request needs to satisfy constraints such as bandwidth traffic conservation, wavelength continuity, wavelength resource occupation uniqueness, wavelength consistency, timeslot continuity, timeslot resource occupation uniqueness, timeslot consistency, and wavelength and timeslot capacity limitation, thereby implementing routing and wavelength and timeslot resource allocation methods in a quantum key distribution optical network. The present invention mainly considers how to measure a security degree of an entire quantum key distribution optical network, a different security level is categorized according to a security requirement of a service request, and different wavelength and timeslot resources are allocated, thereby greatly improving the security performance of the entire quantum key distribution optical network.

Specifically, in a process of optical fiber network transmission, information transmitted for each service request has a different security degree. Quantum key encryption needs to be preferentially performed for a data service with a high priority and importance. In such differentiation, a security requirement degree of a service request and a relative importance and security degree of data of the service request can be differentiated, and the security performance of the network can be measured. If a security level of each service request is under the same constraints, the network is prone to surveillance by hackers and is vulnerable to targeted attacks.

Figure 2:
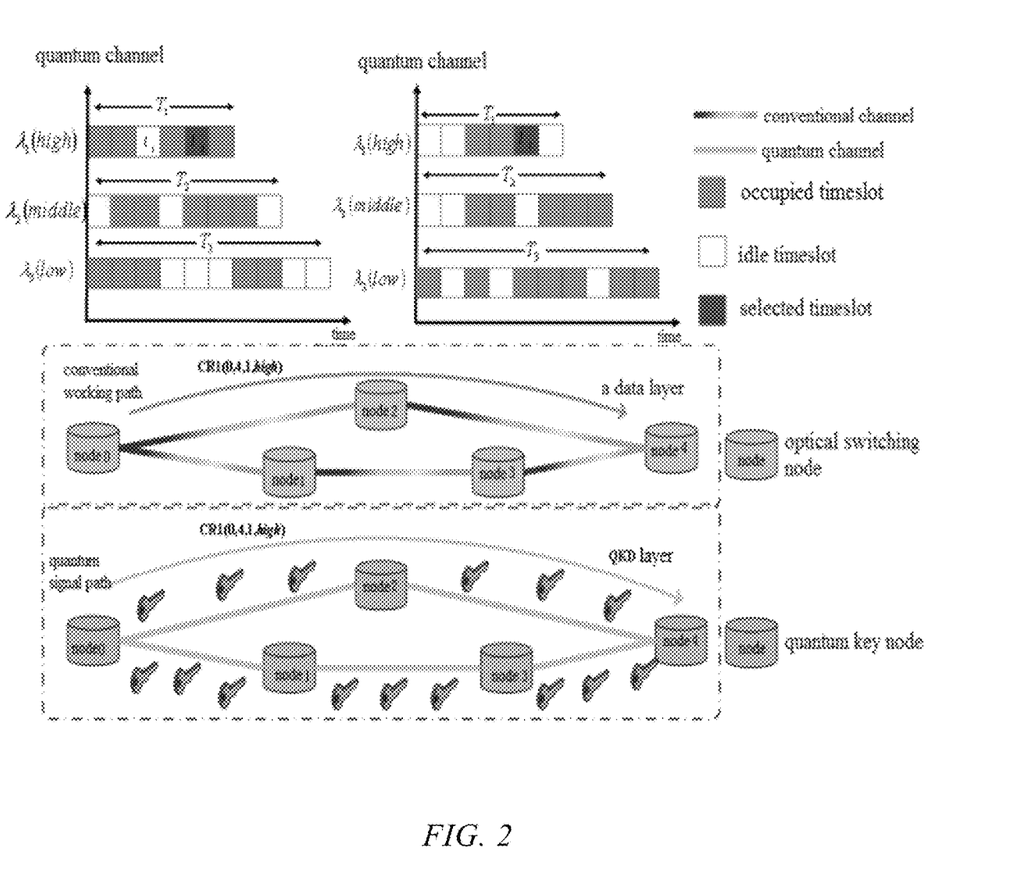
FIG. 2 is a schematic diagram of the architecture of a quantum key distribution optical network according to the present invention.

FIG. 2 shows the architecture of a quantum key distribution optical network with security levels of services, and is a topological graph of a network formed by 5 nodes and 5 links. The topological graph is formed by a QKD layer and a data layer. $\lambda_1$, $\lambda_2$, and $\lambda_3$ respectively correspond to quantum channel wavelengths with a high security level, a medium security level, and a low security level. $T_1$, $T_2$, and $T_3$ respectively correspond to different quantum key update periods. Security requirement levels of service requests respectively correspond to different scores.

When there is a service $CR_1(0,4,1,1,high)$, 0-2-4 is first selected according to a shortest path algorithm as a working path for the service, and next a timeslot resource $t_2$ is allocated in a quantum channel wavelength $\lambda_1$ representing the highest security level.

In a quantum key distribution optical network based on security levels of services, an overall security score of the entire network is:

$$\sum_{(s,d)\in CR} \sum_{(i,j)\in L} \sum_{\lambda \in \Lambda} W_{(i,j),\lambda}^{(s,d)} * SR_{s,d}, \quad (1)$$

where a variable $W_{(i,j),\lambda}^{(s,d)}$ represents that if a connection request (s, d) occupies a conventional wavelength $\lambda$ on a link (i, j), a value of the variable is 1, or otherwise is 0, and $SR_{s,d}$ represents a security score of a service from a source node s to a sink node d.

To solve the problems of security and resource occupation in a quantum key distribution optical network, the present invention proposes an integer linear programming model based on the foregoing service security level classification mechanism, that is, implements joint optimization with objectives of maximizing a security score of a network and minimizing the occupation of wavelength and timeslot resources. Specific steps of the joint optimization model are as follows:

Step 1: Initialize a network. In a quantum key distribution network $G(V,L,\Lambda,\Delta,T)$, V is a set of nodes, L is a set of directed links, $\Lambda=\{\lambda_1, \lambda_2, \lambda_3, \ldots, \lambda_n\}$ is a set of conventional wavelengths in an optical network, $\Delta=\lambda\{_1^Q, \lambda_2^Q, \lambda_3^Q, \ldots, \lambda_n^Q\}$ is a set of quantum channel dedicated wavelengths, $T=\{t_1, t_2, t_3, \ldots, t_n\}$ is a set of available timeslots in a quantum channel. For the topological structure, a link status, the number of the network optical switching nodes, the number of optical fiber links, the number of conventional wavelengths and the number of quantum channel dedicated wavelengths on a link, and the number of timeslots of an optical network are set.

Step 2: Generate a service request. The service request is represented by $CR(s,d,t_k,sl)$, and represents a service request from a source nodes to a destination node d. The service request requires w conventional wavelengths for data transmission. The number of quantum keys used for encryption of the service request is $t_k$ timeslots, and sl is the security requirement level of a service. Conventional work that need to be assigned to each service, quanta, the number of common interaction channel wavelengths, the number of quantum keys allocated to each service, and the security requirement level of the service are set.

Step 3: Establish a joint optimization method with an objective function of maximizing the security score of the network and minimizing the occupation of wavelength and timeslot resources.

The present invention mainly solves the problems of security and resource occupation in a quantum key distribution optical network. The objective function of joint optimization is minimizing the occupancy of wavelength and timeslot resources in the quantum key distribution optical network and maximizing the security score of the entire network. That is, the objective function is mainly formed by a primary optimization objective and a secondary optimization objective. Weights of optimization objectives are changed by adjusting $\alpha$ and $\beta$ ($\alpha \leq 0$ and $0 \leq \beta \leq 1$), to achieve different optimization objectives. When $\alpha = -1$ and $\beta = 0$, the optimization objective becomes implementing a maximum value of the security score of the network. When $\alpha = 0$ and $\beta = 1$, the optimization objective is optimizing the occupancy of wavelength and timeslot resources in the network, to implement the optimization of resource utilization in the network. The optimization objective function may be represented by using the following formula:

Minimize:

$$G = \alpha * \sum_{(s,d) \in CR} \sum_{(i,j) \in L} \sum_{\lambda \in \Lambda} W_{(i,j),\lambda}^{(s,d)} * SR_{s,d} + \quad (2)$$

$$\beta * \left( \sum_{(s,d) \in CR} \sum_{(i,j) \in L} \sum_{\lambda \in \Lambda} W_{(i,j),\lambda}^{(s,d)} + \sum_{(s,d) \in CR} \sum_{(i,j) \in L} \sum_{\lambda^Q \in \Delta} \sum_{t \in T_k} T_{(i,j),\lambda^Q,t}^{(s,d)} \right)$$

where $W_{(i,j),\lambda}^{(s,d)}$ represents an occupation status of a conventional wavelength $\lambda$ by a service request $CR(s, d)$ on a link $(i, j)$, and is 1 if the wavelength is occupied, or otherwise is 0; $T_{(i,j),\lambda^Q,t}^{(s,d)}$, represents an occupation status of a timeslot $t$ on a quantum channel dedicated wavelength $\lambda^Q$ on the link $(i, j)$ by the service request $CR(s,d)$, and is 1 if the timeslot is occupied, or otherwise is 0. The objective G of the integer linear programming model is to maximize the security score of the quantum key distribution optical network and minimizing quantities of wavelengths and timeslots occupied in the optical network. The first part in Formula (2) represents security scores of service requests on the same link in the quantum key distribution optical network. In this way, when the total $W_{(i,j),\lambda}^{(s,d)} * SR_{s,d}$ in the optical network is larger, it indicates that the security score of the entire network is higher. Therefore, the network security score of the quantum key distribution optical network is improved by optimizing $W_{(i,j),\lambda}^{(s,d)} * SR_{s,d}$. The second part in Formula (2) represents total quantities of conventional wavelengths and timeslots occupied in the quantum key distribution optical network. Quantities of wavelengths and timeslots occupied by a connection request are reduced by optimizing $W_{(i,j),\lambda}^{(s,d)}$ and $T_{(i,j),\lambda^Q,t}^{(s,d)}$, to increase the occupancy of resources in the quantum key distribution optical network.

Step S4: Establish constraints satisfying a joint optimization method with a objective function.

During the allocation and optimization of wavelength and timeslot resources in the quantum key distribution optical network, the following constraints need to be satisfied. Specific constraints are shown as follows:

1. Consistency constraint of bandwidth traffic conservation and wavelength and timeslot of a service request:

$$\sum_{j:(i,j) \in L} \sum_{\lambda^Q \in \Delta} \sum_{t \in T_k} T_{(i,j),\lambda^Q,t}^{(s,d)} - \sum_{j:(j,i) \in L} \sum_{\lambda^Q \in \Delta} \sum_{t \in T_k} T_{(i,j),\lambda^Q,t}^{(s,d)} = \quad (3)$$

-continued $$\begin{cases} TR_{s,d} & i = s, \\ -TR_{s,d} & i = d, \forall (s, d), \\ 0 & \text{else,} \end{cases}$$

$$\sum_{j:(i,j) \in L} \sum_{\lambda \in \Lambda} W_{(i,j),\lambda}^{(s,d)} - \sum_{j:(j,i) \in L} \sum_{\lambda \in \Lambda} W_{(i,j),\lambda}^{(s,d)} = \begin{cases} WR_{s,d} & i = s, \\ -WR_{s,d} & i = d, \forall (s, d), \\ 0 & \text{else,} \end{cases} \quad (4)$$

$$\sum_{j:(i,j) \in L} T_{(i,j),\lambda^Q,t}^{(s,d)} = \sum_{j:(j,i) \in L} T_{(i,j),\lambda^Q,t}^{(s,d)} \forall (s, d), i, i \neq s, i \neq d, \lambda^Q \in \Delta, t \in T_k, \quad (5)$$

and $$\sum_{j:(i,j) \in L} W_{(i,j),\lambda}^{(s,d)} = \sum_{j:(j,i) \in L} W_{(i,j),\lambda}^{(s,d)} \forall (s, d), i, i \neq s, i \neq d, \lambda \in \Lambda, \quad (6)$$

where $WR_{s,d}$ represents the number of required conventional wavelengths for one service from the source node s to the sink node d, and $TR_{s,d}$ represents the number of required timeslots for one service from the source node s to the sink node d. The constraints (3) and (4) ensure that in a working path found for each service request, outgoing traffic of a source node is equal to a wavelength requirement $WR_{s,d}$ and a timeslot requirement $TR_{s,d}$ of the service request, and incoming traffic of a destination node is equal to the wavelength requirement $WR_{s,d}$ and the timeslot requirement $TR_{s,d}$ of the service request, and at the same time an intermediate node on a working path of each service has equal incoming traffic and outgoing traffic. The constraints (5) and (6) ensure that wavelength and timeslot resources allocated on each link in a working path satisfy the consistency constraint, that is, each link in a working path selected for a service corresponds to the same positions of wavelength and timeslot resources.

2. Uniqueness constraint of wavelength and timeslot resource occupation:

$$\sum_{(s,d) \in CR} T_{(i,j),\lambda^Q,t}^{(s,d)} \leq 1 \quad \forall (i, j), \lambda^Q \in \Delta, t \in T_k, \text{ and} \quad (7)$$

$$\sum_{(s,d) \in CR} W_{(i,j),\lambda}^{(s,d)} \leq 1 \quad \forall (i, j), \lambda \in \Lambda, \quad (8)$$

where the constraints (7) and (8) ensure the uniqueness of the occupation of conventional wavelength and timeslot resources, that is, any conventional wavelength and timeslot on each link can only be occupied by at most one service at the same time.

3. Wavelength and timeslot capacity constraint:

$$\sum_{(s,d) \in CR} \sum_{\lambda \in \Lambda} W_{(i,j),\lambda}^{(s,d)} \leq |\Lambda| \quad \forall (i, j), \quad (9)$$

$$\sum_{(s,d) \in CR} \sum_{\lambda^Q \in \Delta} Q_{(i,j),\lambda^Q}^{(s,d)} \leq |\Delta| \quad \forall (i, j), \quad (10)$$

$$\sum_{(s,d) \in CR} \sum_{t \in T_k} T_{(i,j),\lambda^Q,t}^{(s,d)} \leq |T_k| \quad \forall (i, j), \text{ and} \quad (11)$$

$$Q_{(i,j),\lambda^Q}^{(s,d)} \leq \sum_{t \in T_k} T_{(i,j),\lambda^Q,t}^{(s,d)} \quad \forall (s, d), (i, j), \lambda^Q \in \Delta, \quad (12)$$

where $|\Lambda|$ represents the number of conventional wavelengths on each link, $|\Delta|$ represents the number of quantum channel dedicated wavelengths on each link, $|T_k|$ represents the number of timeslots in each quantum channel dedicated wavelength, $Q_{(i,j),\lambda^Q,t}^{(s,d)}$ represents an occupation status of the quantum channel dedicated wavelength $\lambda^Q$ on the link (i, j) by a service CR(s,d), and is 1 if the wavelength is occupied, or otherwise is 0. The constraints (9), (10), and (11) describe capacity constraints of conventional wavelengths, quantum dedicated wavelengths, and timeslots in a quantum channel, and represent that in each link, wavelength and timeslot resources allocated to all services should not exceed set wavelength and timeslot thresholds. The constraint (12) represents that different services may occupy different timeslot resources of the same quantum dedicated wavelength; and 4. Continuity constraint of wavelength and timeslot resource:

$$\left(W_{(i,j),\lambda}^{(s,d)} - W_{(i,j),\lambda+1}^{(s,d)} - 1\right) \times (-\theta) \ge \sum_{x \in [\lambda+2,|\Lambda|]} W_{(i,j),x}^{(s,d)} \forall (i, j), (s, d), \lambda, s \ne d, \quad (13)$$

$$\left(W_{(i,j),\lambda}^{(s,d)} - 1\right) \times \theta + WR_{s,d} \le \sum_{\lambda \in \Lambda} \overline{W_{(i,j),\lambda}^{(s,d)}} \forall (i, j), (s, d), \lambda, s \ne d, \quad (14)$$

$$\left(T_{(i,j),\lambda^Q,t}^{(s,d)} T_{(i,j),\lambda^Q,t+1}^{(s,d)} - 1\right) \times (-\theta) \ge \sum_{y \in [t+2,|T_k|]} T_{(i,j),\lambda^Q,y}^{(s,d)} \forall (i, j), \quad (15)$$

Figure 3:
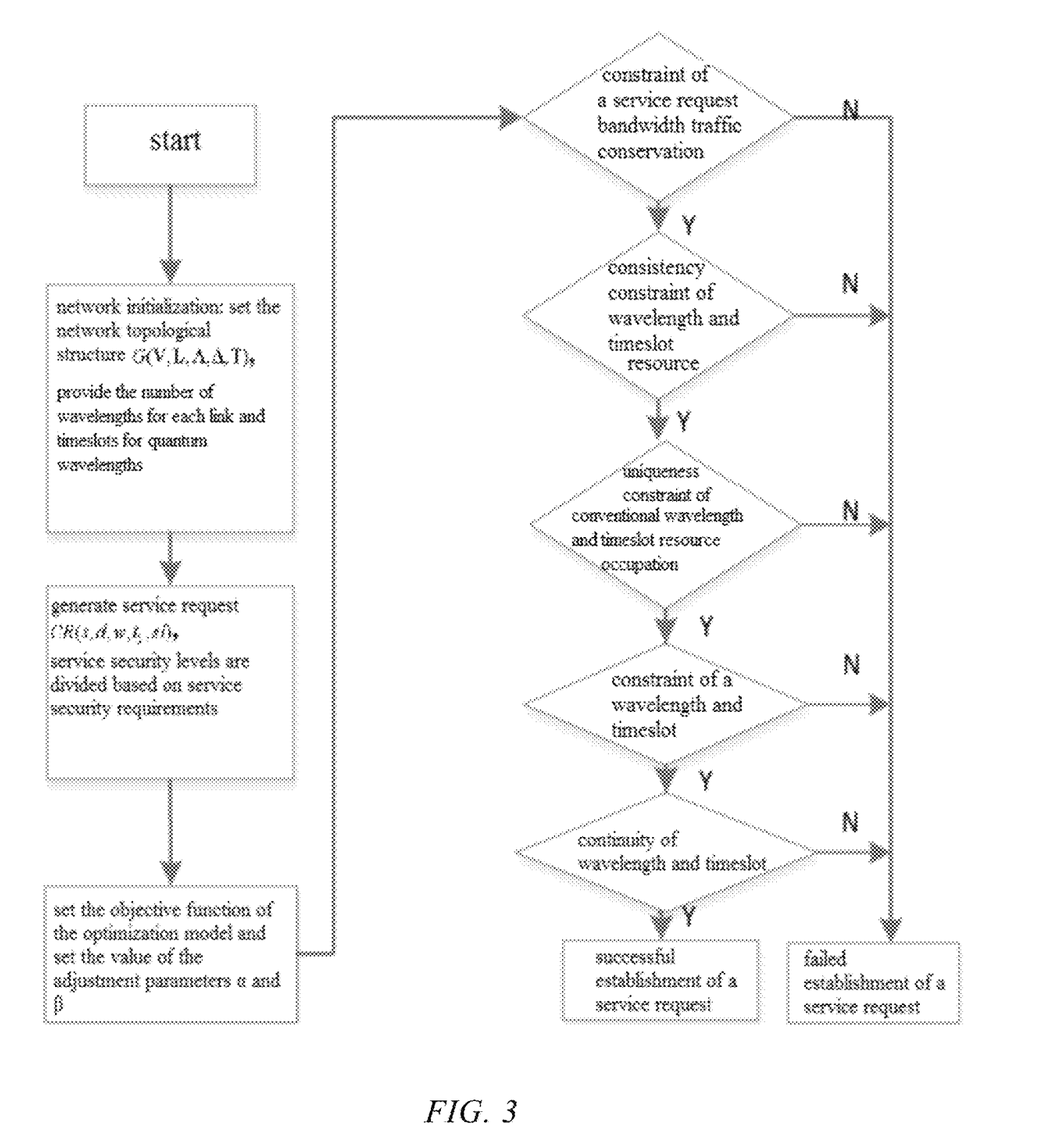
FIG. 3 is a specific schematic flowchart of a resource allocation method according to the present invention.

(s, d), $\lambda^Q$, t, s ≠ d, and $$\left(T_{(i,j),\lambda^Q,t}^{(s,d)} - 1\right) \times \theta + TR_{s,d} \le \sum_{t \in T_k} T_{(i,j),\lambda^Q,t}^{(s,d)} \forall (i, j), (s, d), \lambda^Q, t, s \ne d, \quad (16)$$

where θ is a very large positive number, $WR_{s,d}$ represents the number of required conventional wavelengths for one service from the source node s to the sink node d, and $TR_{s,d}$ represents the number of required timeslots for one service from the source node s to the sink node d. The constraints (13) to (16) describe continuity constraints of conventional wavelengths and timeslots in a quantum channel, and represent that in each link, conventional wavelengths allocated to each service and timeslot resources on quantum channel wavelengths must be in a continuous idle state. A block diagram of a specific procedure of the model is shown in FIG. 3.

The present invention further provides a resource allocation system in a quantum key distribution optical network, including:
- a network initialization module, configured to: set a topological structure of a quantum key distribution optical network, and initialize parameters in the topological structure;
- a service request generation module, configured to: generate a service request, and categorize a security level of a service according to a security requirement degree of the service, where the security level corresponds to a security score;
- an optimization objective establishment module, configured to establish an optimization objective function to maximize a security score of the quantum key distribution optical network and minimize an occupancy of wavelength and timeslot resources; and
- a resource allocation module, configured to: establish a constraint satisfying the optimization objective function, and allocate corresponding wavelength and timeslot resources to the service request under the constraint.

Figure 4:
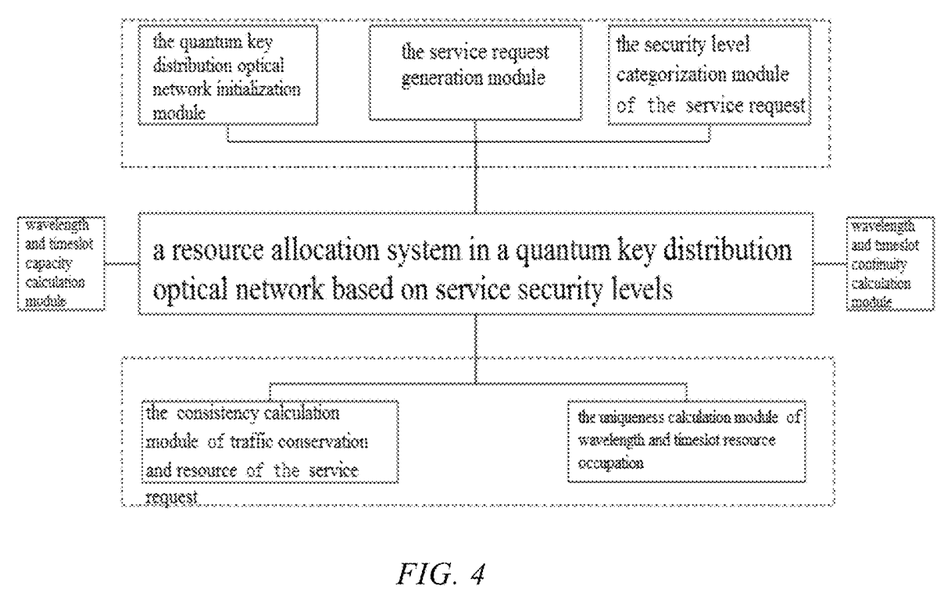
FIG. 4 is a schematic structural diagram of a system according to the present invention.

Specifically, as shown in FIG. 4, the quantum key distribution optical network initialization module configures, in an optical network G(V,L,Λ,Δ,T), a network topological structure, a link status in an optical network, the number of the network optical switching nodes, the number of optical fiber links, the number of conventional wavelengths and the number of quantum channel dedicated wavelengths on a link, and the number of timeslots.

The service request generation module generates a service request CR(s,d,w,$t_k$,sl) according to the even distribution of source nodes and destination nodes, and configures information such as the number of connection requests, source nodes and destination nodes of different connection requests, and bandwidth requirements.

The security level categorization module of the service request mainly preclassifies the service request according to a security requirement degree of the service request CR(s, d,w,$t_k$,sl), and categorizes the security level of the service. For service requests of different security levels, resources are allocated in quantum dedicated wavelengths of corresponding security levels.

The consistency calculation module of traffic conservation and resource of the service request calculates a consistency constraint of traffic conservation and resource of the service request in the quantum key distribution optical network according to Formula (3) to Formula (6), to ensure that incoming traffic is equal to outgoing traffic and resources occupy the same positions on each link.

The uniqueness calculation module of wavelength and timeslot resource occupation calculates a uniqueness constraint of wavelength and timeslot resources according to Formula (7) and Formula (8), to ensure that only one service can be occupied at each moment at each wavelength and timeslot position.

The wavelength and timeslot capacity calculation module calculates a constraint of wavelength and timeslot capacity according to Formula (9) to Formula (12), to ensure that wavelength and timeslot resources allocated to all services do not exceed thresholds set in the quantum key distribution optical network.

The wavelength and timeslot continuity calculation module calculates a wavelength and timeslot continuity constraint according to Formula (13) to Formula (16), to ensure that conventional wavelengths allocated to each service and timeslot resources must be in a continuous idle state.

In the foregoing system description, different modules may collaborate with each other to complete a joint optimization system of the security score of the network and wavelength and timeslot resources.

Embodiment

Figure 5:
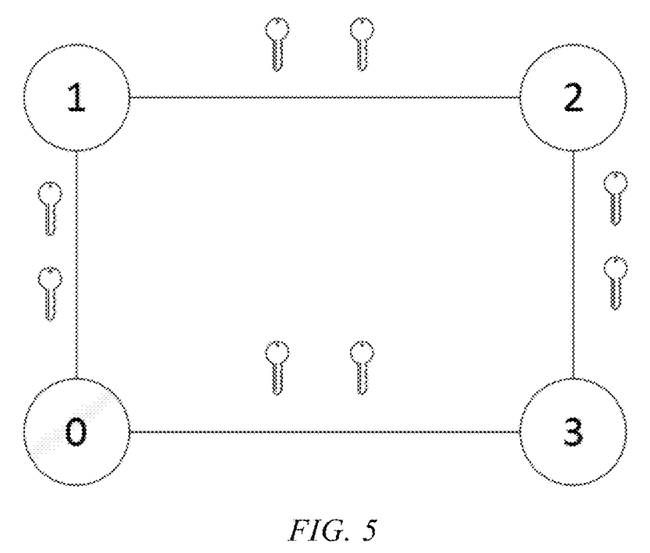
FIG. 5 is a diagram of a topological structure of an optical network according to an embodiment of the present invention.

FIG. 5 is a structural diagram of a network topology of a quantum key distribution optical network used in this embodiment being formed by four nodes and eight links. Based on the foregoing allocation method, a resource allocation process is as follows:

Step 1: Initialize a network. Each optical fiber link is bidirectional. The number of wavelengths on each link is 40. Three wavelengths are respectively allocated on a quantum channel and a common interaction channel. 6, 8, and 10 timeslot resources are respectively provided on each wavelength. 32 wavelengths are allocated on a conventional channel transmitted for a service request, and two wavelengths are reserved between the quantum channel and the common interaction channel.

Step 2: Generate a service request. Establish service requests $CR_1$(0,3,1,1,low) and $CR_2$(0,3,2,1,high). Both service requests are from a source node 0 to a destination node 3. A service $CR_1$ requires one conventional wavelength for data transmission. A service $CR_2$ requires two conventional wavelength for data transmission. Requirements of quantum keys for encryption for the services $CR_1$ and $CR_2$ are both one timeslot. A security requirement level of the first service request is low, that is, the lowest security degree. A security requirement level of the second service request is high, that is, the highest security degree.

Step 3: Determine and execute the objective function of maximizing the security score of the network and minimizing the occupation of wavelengths and timeslots in the quantum key distribution optical network proposed in the present invention. See Formula (2).

Step 4: Determine and execute constraints in the joint optimization method in the quantum key distribution optical network. In a process of allocating a resource to each service, it is necessary to satisfy the consistency constraint of bandwidth traffic conservation and wavelength and timeslot of the service request (see Formula (3) to Formula (6)), the uniqueness constraint of conventional wavelength and timeslot resource occupation (see Formula (7) and Formula (8)), the wavelength and timeslot capacity constraint (see Formula (9) to Formula (12)), and the continuity constraint of wavelength and timeslot resource (see Formula (13) to Formula (16)).

Figure 6:
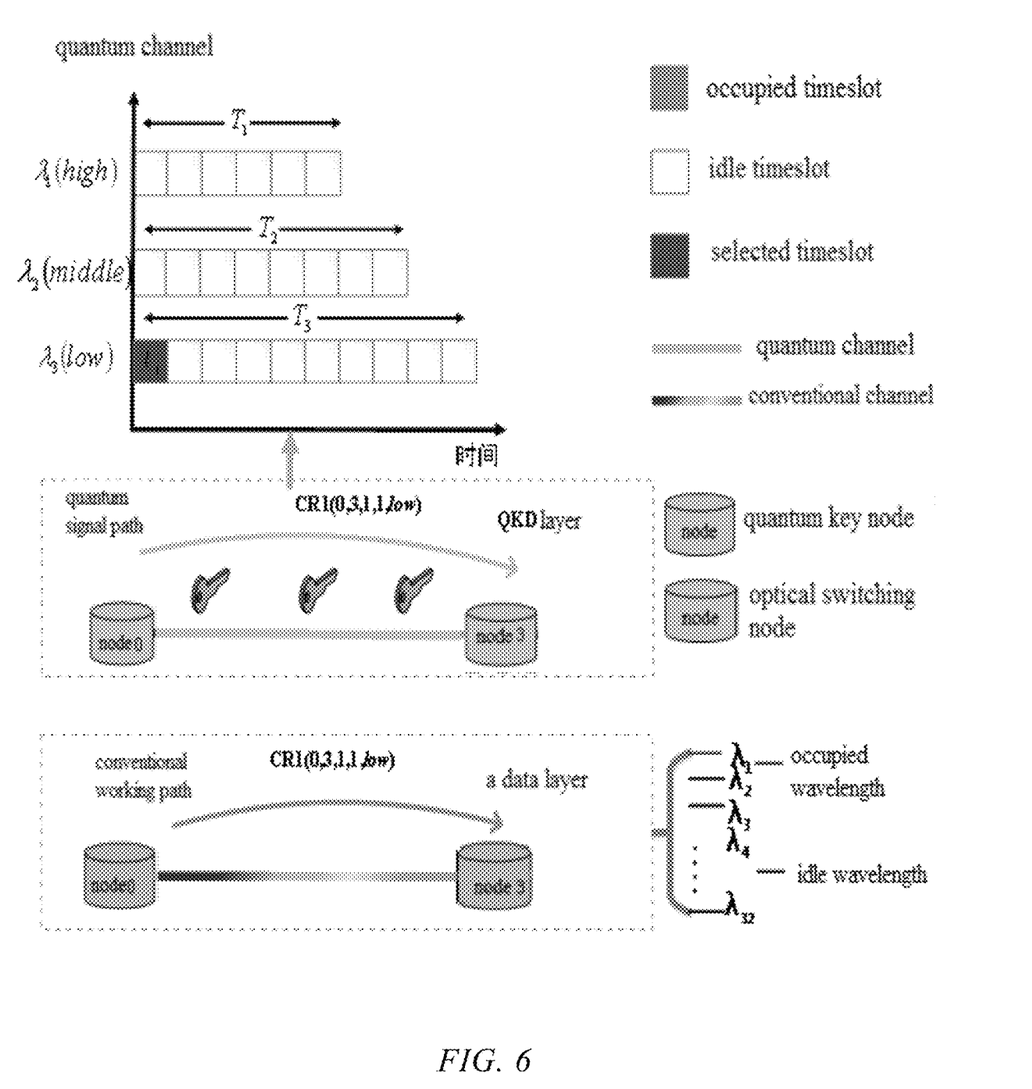
FIG. 6 is a schematic diagram of resource allocation according to an embodiment of the present invention.

Through the foregoing steps, corresponding wavelength and timeslot resources can be allocated to the service requests $CR_1(0,3,1,1,low)$ and $CR_2(0,3,2,1,high)$ in the network based on a target condition. Because both services have security requirements of encryption, during the allocation of quantum channel wavelengths and timeslot resources, it is necessary to consider the maximization of the overall security performance of the network and the minimization of the occupation of wavelength and timeslot resources. For $CR_1(0,3,1,1,low)$, both a path 0-3 and a path 0-1-2-3 may be selected as a working path of the service. Resource allocation and security assessment are performed on the path 0-3, as shown in FIG. 6. The allocation of conventional wavelengths in the data layer is first performed, which is consistent with a conventional method. Next, idle timeslot resources are allocated to the service $CR_1$ in a wavelength $\lambda_3$ corresponding to a low security level. In this case, the security score of the entire network and the total quantities of conventional wavelengths and timeslots are calculated. For the path 0-1-2-3, the same steps are performed to allocate wavelength and timeslot resources. Finally, a path of resource allocation and a position of resource allocation are determined based on the objective function of maximizing the security score of the network and minimizing the occupation of wavelength and timeslot resources in the optical network proposed in the patent. If conditions are satisfied, in this case, services in the network have all been successfully established. For a group of service requests, that is, $CR_1$ and $CR_2$, optimal wavelength and timeslot resources are allocated, to maximum the security score of the quantum key distribution optical network, so that the entire network has the highest security degree.

The present invention mainly improves the security performance of a quantum key distribution optical network and solves the problem of wavelength and timeslot allocation. In a process of actual data transmission, each service has a different security requirement degree. Therefore, the present invention proposes an assessment mechanism for the overall security performance of a network based on a security requirement level. Next, a joint optimization method with an objective of maximizing a network security score of a quantum key distribution optical network and minimizing the occupation of wavelength and timeslot resources in the optical network are established according to the assessment mechanism, and problems of route calculation, conventional wavelengths, and the allocation of quantum channel dedicated wavelengths and timeslots in the quantum key distribution optical network are solved by using an integer linear programming method. In the quantum key distribution optical network, certain service requests are generated, and sufficient wavelength and timeslot resources are provided for allocation to the service requests without causing a service congestion. Next, a joint optimization method of maximizing a security score of a network and minimizing the occupation of wavelengths and timeslots is established according to an optimization objective to be achieved and constraints in an allocation process for the service requests, thereby finding an optimal resource allocation method for all service requests.

The method can effectively measure the security degree of the entire network, and solve the problem of security encryption in a quantum key distribution optical network, thereby greatly improving the overall security performance of the quantum key distribution optical network. In addition, an appropriate working path is found for each service request, to reduce a waste of wavelength and timeslot resources in the network, thereby greatly improving the utilization of resources, reducing the consumption of quantum keys, and greatly reducing costs. The problem of low quantum key utilization in a current quantum key distribution optical network is solved, thereby ensuring the quality of service and security of a service request in a transmission process.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A resource allocation method in a quantum key distribution optical network, comprising steps of:
   S1: setting a topological structure of a quantum key distribution optical network, and initializing parameters in the topological structure;
   S2: generating a service request, and categorizing a security level of a service according to a security requirement degree of the service, wherein the security level corresponds to a security score;
   S3: establishing an optimization objective function to maximize a security score of the quantum key distribution optical network and minimize an occupancy of wavelength and timeslot resources; and
   S4: establishing a constraint satisfying the optimization objective function, and allocating corresponding wavelength and timeslot resources to the service request under the constraint,
   wherein the optimization objective function is:

$$G = \alpha * \sum_{(s,d) \in CR} \sum_{(i,j) \in L} \sum_{\lambda \in \Lambda} W_{(i,j),\lambda}^{(s,d)} * SR_{s,d} + \tag{2}$$

-continued $$\beta * \left( \sum_{(s,d) \in CR} \sum_{(i,j) \in L} \sum_{\lambda \in \Lambda} W_{(i,j),\lambda}^{(s,d)} + \sum_{(s,d) \in CR} \sum_{(i,j) \in L} \sum_{\lambda^Q \in \Delta} \sum_{t \in T_k} T_{(i,j),\lambda^Q,t}^{(s,d)} \right)$$

wherein $W_{(i,j),\lambda}^{(s,d)}$ represents an occupation status of a conventional wavelength $\lambda$ by a service request CR(s, d) on a link (i, j), and is 1 if the wavelength is occupied, or otherwise is 0; $T_{(i,j),\lambda^Q,t}^{(s,d)}$ represents an occupation status of a timeslot t on a quantum channel dedicated wavelength $\lambda^Q$ on the link (i, j) by the service request CR(s,d), and is 1 if the timeslot is occupied, or otherwise is 0; $SR_{s,d}$ represents a security score from a source node s to a destination node d; and $\alpha$ and $\beta$ are adjustment parameters, and weights of optimization objectives are changed by adjusting $\alpha$ and $\beta$.

2. The resource allocation method in a quantum key distribution optical network according to claim 1, wherein the topological structure of the quantum key distribution optical network is G(V,L,Λ,Δ,T), wherein a parameter V is a set of optical switching nodes, L is a set of directed links, $\Lambda = \{\lambda_1, \lambda_2, \lambda_3, \ldots, \lambda_n\}$ is a set of conventional wavelengths in an optical network, $\Delta = \{\lambda_1^Q, \lambda_2^Q, \lambda_3^Q, \ldots, \lambda_n^Q\}$ is a set of quantum channel dedicated wavelengths, $T = \{t_1, t_2, t_3, \ldots, t_n\}$ is a set of available timeslots in a quantum channel, and the initializing parameters in the topological structure comprising setting a link status, the number of the optical switching nodes, the number of optical fiber links, the number of conventional wavelengths and the number of quantum channel dedicated wavelengths on a link, and the number of timeslots.

3. The resource allocation method in a quantum key distribution optical network according to claim 1, wherein a service request $CR(s,d,w,t_k,sl)$ is generated in step S2, the service request $CR(s,d,w,t_k,sl)$ requires w conventional wavelengths for data transmission from a source node s to a destination node d, the number of quantum keys used for encryption is $t_k$ timeslots, and sl is the security level of the service.

4. The resource allocation method in a quantum key distribution optical network according to claim 3, wherein in the quantum key distribution optical network, an overall security score of the entire network is:

$$\sum_{(s,d) \in CR} \sum_{(i,j) \in L} \sum_{\lambda \in \Lambda} W_{(i,j),\lambda}^{(s,d)} * SR_{s,d}, \quad (1)$$

wherein $W_{(i,j),\lambda}^{(s,d)}$ represents that when a connection request (s, d) occupies a conventional wavelength $\lambda$ on a link (i, j), a value of the variable is 1, or otherwise is 0, and $SR_{s,d}$ represents a security score from the source node s to the destination node d.

5. The resource allocation method in a quantum key distribution optical network according to claim 1, wherein a method for using the optimization objective function G to maximize the security score of the quantum key distribution optical network and minimize the occupancy of wavelength and timeslot resources comprises steps of: increasing the security score of the quantum key distribution optical network by optimizing a total $W_{(i,j),\lambda}^{(s,d)} * SR_{s,d}$, reducing the number of wavelengths and timeslots occupied by a connection request by optimizing $W_{(i,j),\lambda}^{(s,d)}$ and $T_{(i,j),\lambda^Q,t}^{(s,d)}$, to increase an occupancy of resources in the quantum key distribution optical network.

6. The resource allocation method in a quantum key distribution optical network according to claim 1, wherein the constraint in step S4 comprises: a consistency constraint of bandwidth traffic conservation and wavelength and timeslot resource of a service request, an uniqueness constraint of wavelength and timeslot resource occupation, a wavelength and timeslot, and a continuity constraint of wavelength and timeslot resource.

7. The resource allocation method in a quantum key distribution optical network according to claim 5, wherein the consistency constraint of bandwidth traffic conservation and wavelength and timeslot resource of the service request comprises:

$$\sum_{j:(i,j) \in L} \sum_{\lambda^Q \in \Delta} \sum_{t \in T_k} T_{(i,j),\lambda^Q,t}^{(s,d)} - \sum_{j:(j,i) \in L} \sum_{\lambda^Q \in \Delta} \sum_{t \in T_k} T_{(i,j),\lambda^Q,t}^{(s,d)} = \begin{cases} TR_{s,d} & i = s, \\ -TR_{s,d} & i = d, \forall (s, d), \\ 0 & \text{else}, \end{cases} \quad (3)$$

$$\sum_{j:(i,j) \in L} \sum_{\lambda \in \Lambda} W_{(i,j),\lambda}^{(s,d)} - \sum_{j:(j,i) \in L} \sum_{\lambda \in \Lambda} W_{(i,j),\lambda}^{(s,d)} = \begin{cases} WR_{s,d} & i = s, \\ -WR_{s,d} & i = d, \forall (s, d), \\ 0 & \text{else}, \end{cases} \quad (4)$$

$$\sum_{j:(i,j) \in L} T_{(i,j),\lambda^Q,t}^{(s,d)} = \sum_{j:(j,i) \in L} T_{(i,j),\lambda^Q,t}^{(s,d)} \forall (s,d), i, i \neq s, i \neq d, \lambda^Q \in \Delta, t \in T_k, \quad (5)$$

and $$\sum_{j:(i,j) \in L} W_{(i,j),\lambda}^{(s,d)} = \sum_{j:(j,i) \in L} W_{(i,j),\lambda}^{(s,d)} \forall (s,d), i, i \neq s, i \neq d, \lambda \in \Lambda, \quad (6)$$

wherein in the constraints (3) and (4), in a working path found for each service request, outgoing traffic of a source node is equal to a wavelength requirement $WR_{s,d}$ and a timeslot requirement $TR_{s,d}$ of the service request, and incoming traffic of a destination node is equal to the wavelength requirement $WR_{s,d}$ and the timeslot requirement $TR_{s,d}$ of the service request, and at the same time an intermediate node on a working path of each service has equal incoming traffic and outgoing traffic; and in the constraints (5) and (6), wavelength and timeslot resources allocated on each link in a working path satisfy the consistency constraint, that is, each link in a working path selected for a service corresponds to the same positions of wavelength and timeslot resources;

the uniqueness constraint of wavelength and timeslot resource occupation comprises:

$$\sum_{(s,d) \in CR} T_{(i,j),\lambda^Q,t}^{(s,d)} \leq 1 \quad \forall (i,j), \lambda^Q \in \Delta, t \in T_k, \quad \text{and} \quad (7)$$

$$\sum_{(s,d) \in CR} W_{(i,j),\lambda}^{(s,d)} \leq 1 \quad \forall (i,j), \lambda \in \Lambda, \quad (8)$$

wherein in the constraints (7) and (8), any conventional wavelength and timeslot on each link can only be occupied by at most one service at the same time;

the wavelength and timeslot capacity constraint comprises:

$$\sum_{(s,d) \in CR} \sum_{\lambda \in \Lambda} W_{(i,j),\lambda}^{(s,d)} \leq |\Lambda| \quad \forall (i,j), \quad (9)$$

-continued $$\sum_{(s,d)\in CR}\sum_{\lambda^Q\in\Delta} Q^{(s,d)}_{(i,j),\lambda^Q} \leq |\Delta| \quad \forall\, (i,j), \tag{10}$$

$$\sum_{(s,d)\in CR}\sum_{t\in T_k} T^{(s,d)}_{(i,j),\lambda^Q,t} \leq |T_k| \quad \forall\, (i,j), \text{ and} \tag{11}$$

$$Q^{(s,d)}_{(i,j),\lambda^Q} \leq \sum_{t\in T_k} T^{(s,d)}_{(i,j),\lambda^Q,t} \quad \forall\, (s,d), (i,j), \lambda^Q \in \Delta, \tag{12}$$

wherein $|\Lambda|$ represents the number of conventional wavelengths on each link, $|\Delta|$ represents the number of quantum channel dedicated wavelengths on each link, $|T_k|$ represents the number of timeslots in each quantum channel dedicated wavelength, $Q^{(s,d)}_{(i,j),\lambda^Q}$ represents an occupation status of the quantum channel dedicated wavelength $\lambda^Q$ on the link (i, j) by a service CR(s,d), and is 1 if the wavelength is occupied, or otherwise is 0; the constraints (9), (10), and (11) represent that in each link, wavelength and timeslot resources allocated to all services are less than set wavelength and timeslot thresholds; and the constraint (12) represents that different services may occupy different timeslot resources of the same quantum dedicated wavelength; and the continuity constraint of wavelength and timeslot resource comprises:

$$\left(W^{(s,d)}_{(i,j),\lambda} - W^{(s,d)}_{(i,j),\lambda+1} - 1\right)\times(-\theta) \geq \sum_{x\in[\lambda+2,|\Lambda|]} W^{(s,d)}_{(i,j),x} \forall\, (i,j), (s,d), \lambda, s\neq d, \tag{13}$$

$$\left(W^{(s,d)}_{(i,j),\lambda} - 1\right)\times\theta + WR_{s,d} \leq \sum_{\lambda\in\Lambda} W^{(s,d)}_{(i,j),\lambda} \forall\, (i,j), (s,d), \lambda, s\neq d, \tag{14}$$

$$\left(T^{(s,d)}_{(i,j),\lambda^Q,t} T^{(s,d)}_{i,j),\lambda^Q,t+1} - 1\right)\times(-\theta) \geq \sum_{y\in[t+2,|T_k|]} T^{(s,d)}_{(i,j),\lambda^Q,y} \forall\, (i,j), \tag{15}$$

$$(s,d), \lambda^Q, t, s\neq d, \text{ and}$$

$$\left(T^{(s,d)}_{(i,j),\lambda^Q,t} - 1\right)\times\theta + TR_{s,d} \leq \sum_{t\in T_k} T^{(s,d)}_{(i,j),\lambda^Q,t} \forall\, (i,j), (s,d), \lambda^Q, t, s\neq d, \tag{16}$$

wherein θ is a positive number, and the constraints (13) to (16) represent that in each link, conventional wavelengths allocated to each service and timeslot resources on quantum channel wavelengths are in a continuous idle state.

\* \* \* \* \*